Nov. 28, 1939.  C. C. COONS  2,181,561

ABSORPTION REFRIGERATION

Filed May 25, 1936

INVENTOR
Curtis C. Coons
BY
Harry T. Demarse
ATTORNEY

Patented Nov. 28, 1939

2,181,561

UNITED STATES PATENT OFFICE 2,181,561

ABSORPTION REFRIGERATION

Curtis C. Coons, North Canton, Ohio, assignor to The Hoover Company, North Canton, Ohio, a corporation of Ohio Application May 25, 1936, Serial No. 81,676

6 Claims. (Cl. 62—119.5)

This invention relates to continuous absorption refrigerating systems and more particularly to a new and novel combination of an absorber, an analyzer and a boiler therefor.

It has also been proposed to employ an analyzer in a continuous absorption refrigerating system using inert gas and in which a bubble pump or gas lift pump is employed for circulating absorption liquid. The use of an analyzer in a system in which a gas lift pump is employed has not met with as marked success as was desirable, however, because the gas lift pump requires a certain head of liquid in order to make it operate satisfactorily and the use of an analyzer in the portion of the apparatus where this liquid head normally exists complicates the operation of the gas lift pump and also makes it necessary to have the gas lift pump located at a lower level than would otherwise be the case.

It is an object of the present invention to provide a continuous absorption refrigerating system of the type in which an inert gas is employed (or in which other means is provided for causing the production of refrigeration without the maintenance of a large pressure difference between the boiler and the absorber) with an analyzer, the analyzer being used in combination with power driven means for circulating absorption liquid between the boiler, absorber and analyzer.

It is another object of the invention to provide more effective means for separating refrigerant generated in the boiler from the absorption liquid therein in an absorption system in which the boiler and the absorber are in open communication.

It is still another object of the invention to provide a continuous absorption system of the type in which the boiler and the absorber are in open communication with an analyzer located above the boiler so that absorption liquid may flow by gravity from the absorber to the analyzer and after passing through the analyzer flow into the boiler. At the same time an arrangement is provided in which refrigerant gas generated in the boiler passes in an upwardly direction through the boiler-analyzer assembly.

Figure 1:
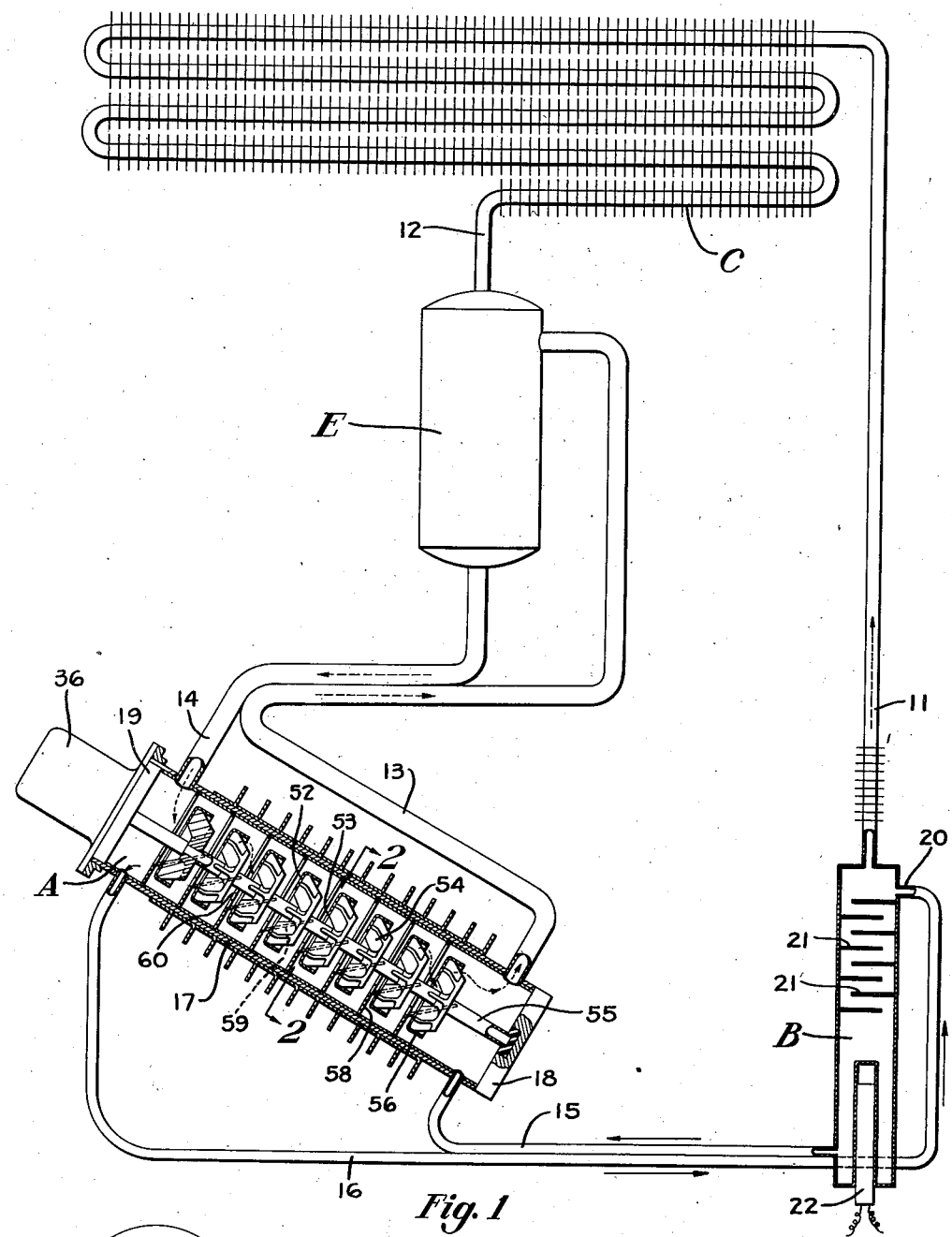
Figure 2:
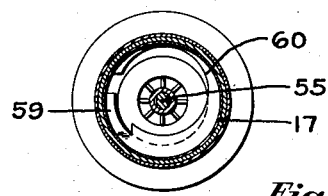

Other objects and advantages reside in certain novel features of the arrangement and construction of parts as will be apparent from the following description taken in connection with the accompanying drawing in which, Figure 1 is a diagrammatic illustration of a continuous absorption system using inert gas and in which the boiler, analyzer and absorber are shown in longitudinal cross section to better illustrate their construction, and Figure 2 is a transverse cross sectional view of the absorber taken along the line 2—2 of Figure 1.

Referring to the drawing in detail, it will be seen that a continuous absorption refrigerating system is illustrated as consisting of a boiler-analyzer assembly B, a condenser C, an evaporator E and an absorber A connected together in a more or less conventional manner. The boiler-analyzer B is connected to the condenser C by means of a conduit 11 a portion of which may act as a rectifier so that when heat is applied to the boiler-analyzer, refrigerant gas will flow through the pipe 11, condense in the condenser C, and be fed into the evaporator through the conduit 12. The evaporator E is connected to the absorber A by means of two gas conduits 13 and 14 which may be in heat exchange relation and which form a circuit for the flow of inert gas between the evaporator and the absorber as is well known in the continuous absorption refrigeration art.

The boiler-analyzer B is connected to the absorber by means of two liquid conduits 15, 16 which may be in heat exchange relation.

The absorber A illustrated in Figures 1 and 2 is more particularly described and claimed in the co-pending application of Arnold D. Siedle, Serial Number 63,191 filed February 10, 1936. As there shown and described the absorber consists of a cylinder 17 disposed in an inclined position and provided with end pieces or heads 18 and 19. The conduit 15 mentioned above is connected to the lower part of the absorber and the conduit 16 is connected to the upper end thereof and constitutes an outlet for absorption liquid lifted or pumped from the lower level of the absorber to the upper end thereof, as will now be described.

Absorption liquid is pumped through the absorber vessel 17 from a pool formed in the lower end thereof near the point of connection of the conduit 15. To accomplish this rotating means is provided in the absorber and this rotating means not only causes circulation of the inert gas but also causes the absorption liquid to be pumped upwardly through the absorber and splashed over the inside of the vessel 17.

The rotating means may be mounted on a shaft 55 in the vessel 17 the shaft being driven by an electric motor 36 sealed to the end plate 19.

The rotating means consists of a number of discs 52 each of which has a central opening 53 therein and a centrifugal fan structure 54 secured thereto. The outer portion of each disc 52 is provided with a downwardly extending flange 56 which in a sense cooperates with the main body of the disc 52 to provide a shroud for the fan 54. Upon rotation of the shaft 55, liquid is thrown off radially and tangentially from the disc 52.

In the absorber shown, baffle plates 58 are provided in the vessel 17, these being disposed at right angles to the shaft 55 and in parallel to the rotating element 52. Each plate 58 has a large depending lip 59 struck downwardly therefrom so as to extend alongside and just outside the circle described by the rotating element. When liquid is taken from the pools formed in the absorber above the baffle plate 58 by the rotating element and splashed outwardly around the inner wall of the absorber, some of this liquid will fall upon the lips 59. These lips have such an inclination that this liquid will flow into the pools above the baffles with which they are integral. Thus the arrangement provides means for successively pumping the liquid from one pool to the next above it so that the liquid flows upwardly through the absorber.

Aside from the lips 59 which are struck from the body of the baffle plates 58, thus leaving openings therein, the plates need have only central openings for the passage of the shaft 55 therethrough. In the preferred arrangement, however, those central openings are made large enough to allow the entire rotor assembly to pass through the baffle plates and this arrangement is illustrated in the drawing, the openings being shown at 60.

Inert gas is caused to pass downwardly through the absorber A by the rotating elements, the gas entering the absorber through the conduit 14 and after passing downwardly therethrough flowing back to the evaporator through the conduit 13. The inert gas may be caused to circulate in either direction, however, but an arrangement in which it flows in counterflow to the passage of liquid upwardly through the absorber is preferred.

As has been mentioned above, the upper part of the boiler-analyzer structure marked B provides means for aiding in the separation of refrigerant vapors generated in the boiler from the absorption liquid. It will be noted that the point of connection of the conduit 16 to the vessel B is at the upper end thereof, as indicated at 20 and that this inlet is above a number of baffle plates arranged in staggered relation as illustrated at 21. The baffle plates 21 constitute the analyzer. They merely cause the liquid supplied to the vessel B to come into intimate contact with the refrigerant vapor generated in the lower part of the vessel B as heat is supplied thereto by some means such as the electric cartridge heater 22. Various other forms of baffle plates may be used in place of the arrangement illustrated.

An important advantage in the present invention results from the fact that the liquid flows by gravity from the top of the absorber A into the top of the analyzer and flows by gravity downwardly over the baffle plates 21 through the boiler and back to the lower part of the absorber. In this respect the arrangement differs from all prior constructions. In prior constructions where power driven pumping has been provided, the strong absorption liquid is forced into the boiler by means of the pump which is located in the strong aqua or rich absorption liquid pipe, such as the pipe 16, which carries the liquid into the boiler-analyzer assembly. In accordance with the present invention, the pumping means may be located either in the weak aqua pipe 15 or in the absorber itself.

On the other hand, by the adoption of some power driven means for circulating the absorption liquid in a system of the type in which an inert gas is used, advantages resulting from the use of the analyzer can be obtained which are not possible in the arrangements known to the prior art in which a gas lift pump is employed to circulate the absorption liquid. The use of the analyzer does not in any way interfere with or affect the amount of absorption liquid circulated, this being dependent only upon the resistances in the conduits 15 and 16 and other factors not affected by the presence of the analyzer. Furthermore the boiler need not be located a great distance below the absorber and, in fact, may be substantially alongside the same, as illustrated in Figure 1 of the present arrangement.

While only one embodiment of the invention has been shown and described herein, it is obvious that various changes may be made without departing from the spirit of the invention. It is within the purview of the invention to provide a liquid pump like that disclosed in the co-pending application to Curtis C. Coons, Serial Number 55,449 filed December 23, 1935 and the present application may be regarded as a continuation in part of this earlier application inasmuch as many of the claims herein read upon this earlier construction. Without repeating the description of the arrangement in said earlier case, it will be sufficient here to state that the liquid pumping means may be outside the absorber and may pump the absorption liquid into the top of the absorber to allow it to flow downwardly therethrough by gravity and leave the absorber at the lower end thereof, provided the point of connection of the conduit 15 to the boiler-analyzer assembly, as shown at 20 in the present case is located sufficiently below the outlet of the absorber to permit absorption liquid to flow by gravity from the absorber into the analyzer. Various other changes may be made in the arrangement and construction of parts without departing from the spirit of the invention or the scope of the annexed claims.

I claim:

1. In an absorption refrigerating system of the type having an absorber and a boiler in open communication, the combination with said absorber and boiler of power driven liquid pumping means, an analyzer and connecting conduits, the arrangement being such that absorption liquid flows by gravity from the absorber through the analyzer and boiler and absorption liquid flows from said boiler to said liquid pumping means to be lifted by said pumping means upwardly through the absorber.

2. In an absorption refrigerating system of the type having an absorber and a boiler in open communication, the combination with said absorber and boiler of power driven liquid pumping means, an analyzer and connecting conduits, the arrangement being such that absorption liquid flows by gravity from the absorber through the analyzer and boiler and absorption liquid flows from said boiler to said liquid pumping means to be lifted by said pumping means to the top of the absorber, the pumping means being located inside said absorber.

3. In an absorption refrigerating system of the type in which all the parts are in open unobstructed communication, the combination of a boiler, an analyzer located above and connected to the boiler and having a liquid inlet at its upper end, an absorber having a liquid inlet below said analyzer and a liquid outlet located above and connected to the liquid inlet to the analyzer whereby liquid can flow by gravity from the outlet of the absorber to said analyzer and from the analyzer through said boiler, and power driven liquid pumping means connected to said boiler for raising the absorption liquid from the level of the boiler to a level above the outlet to the absorber.

4. In an absorption refrigerating system of the type in which all the parts are in open unobstructed communication, the combination of a boiler, an analyzer located above and connected to the boiler and having a liquid inlet at its upper end, an absorber having a liquid outlet located above and connected to the liquid inlet to the analyzer whereby liquid can flow by gravity from the outlet of the absorber to said analyzer and from the analyzer through said boiler and power driven liquid pumping means connected to said boiler for raising the absorption liquid from the level of the boiler to a level above the outlet to the absorber, said pumping means being located in the absorber and being arranged to cause absorption liquid to flow upwardly through said absorber.

5. The method of producing refrigeration which includes the steps of supplying weak absorption solution to an absorbing zone, simultaneously creating sprays of the weak solution at successively higher elevations, each spray being formed from liquid supplied by a spray at a lower elevation, passing a mixture of pressure equalizing medium and refrigerant vapor through the sprays, and passing the strong solution formed in the absorbing zone into contact with refrigerant vapor and absorption liquid vapor flowing from a generating zone.

6. That improvement in the art of refrigeration which includes the steps of applying heat to strong absorption solution to liberate refrigerant vapor, contacting weak absorption solution with a pressure equalizing medium laden with refrigerant vapor flowing in counterflow relationship with the solution while elevating the solution, and flowing the elevated solution in counterflow and contacting relationship with freshly liberated refrigerant vapor.

CURTIS C. COONS.